Figure 1:
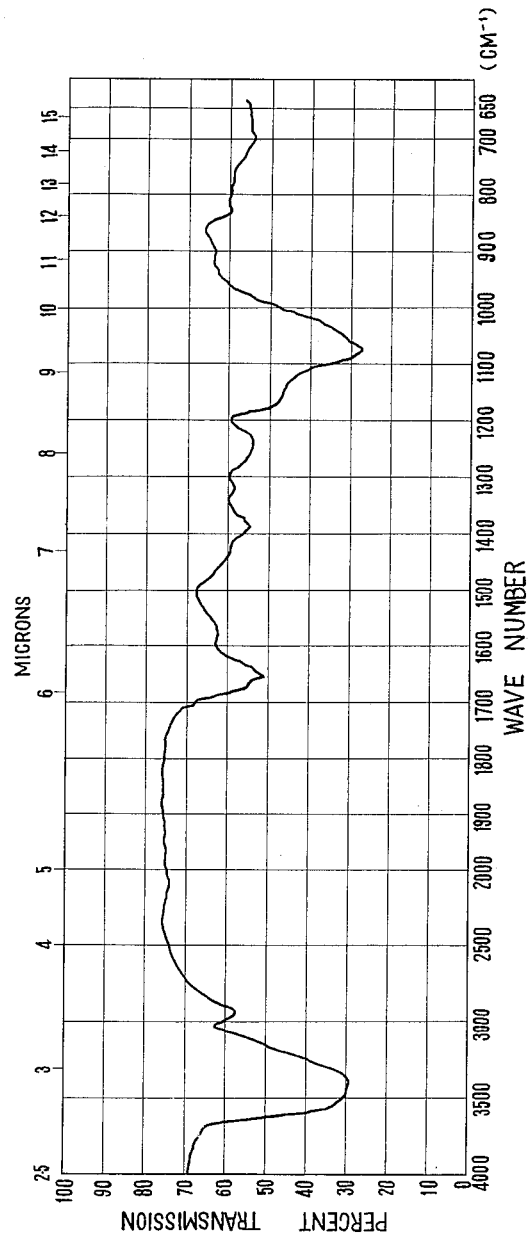

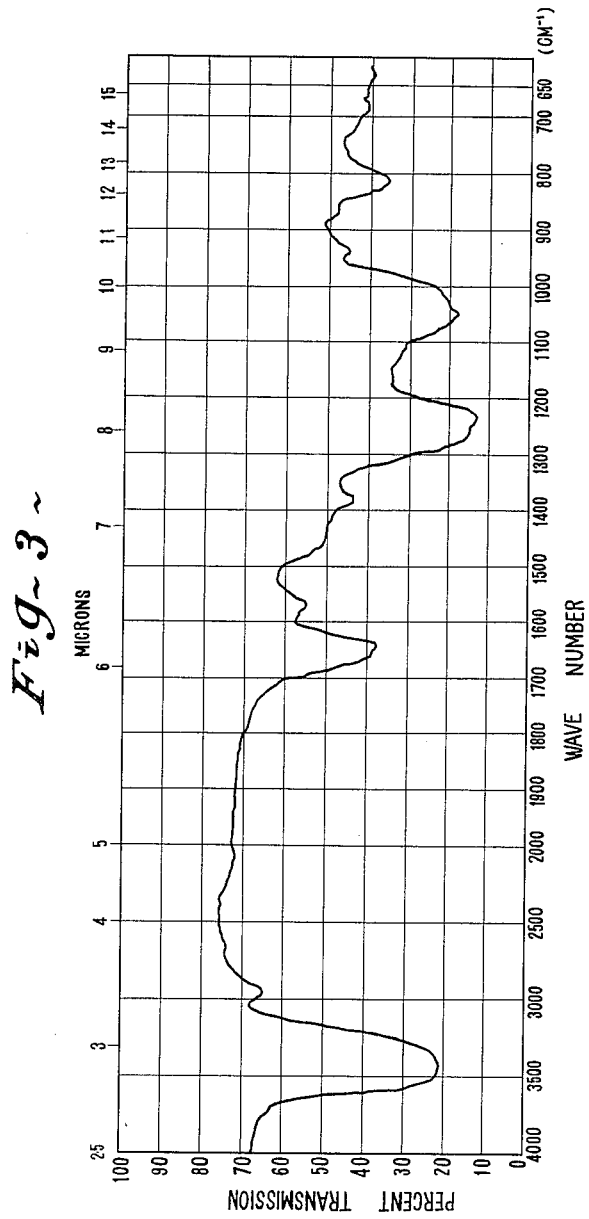

United States Patent Office 3,211,616
Patented Oct. 12, 1965

3,211,616
N,O-SULFATED NEUTRAL-MUCOPOLY-
SACCHARIDE
Zensaku Yosizawa, 46 Kita-8-bancho, Sendai, Japan
Filed Dec. 13, 1962, Ser. No. 244,433
Claims priority, application Japan, Dec. 17, 1961,
36/45,793
1 Claim. (Cl. 167—74)

This invention relates to a sulfated neutral-mucopolysaccharide. More particularly, this invention relates to N,O-sulfated neutral-mucopolysaccharide having lipemia clearing activity, in which sulfate groups are bound to all the free amino groups of N-deacetylated hexosamines and to no less than one hydroxyl group in the monosaccharide unit of the mucopolysaccharide.

Since the discovery by Hahn in 1943 that a dog suffering from alimentary lipemia is cured by the intravenous injection of heparin, considerable interest has been directed to heparin. However, heparin is hardly usable for practical purposes as an antilipemia agent, because of its strong blood coagulative activity.

Carrying out an extensive study for obtaining a desirable antilipemia agent, the present inventor has found that certain sulfated neutral-mucopolysaccharide has a high lipemia clearing activity in particular without giving substantial ill effect to the living animal body; no clinical test data in the human body is available. The present invention is accomplished on the basis of the above-mentioned new findings.

The object of this invention is the embodiment of an antilipemia agent having no substantial ill effect. The object is realized by the discovery of N,O-sulfated neutral-mucopolysaccharide, in which sulfate groups are bound to all the free amino groups of N-deacetylated hexosamines and to no less than one hydroxyl group in the monosaccharide unit of the mucopolysaccharide.

Neutral-mucopolysaccharide, the starting material of this invention, is mucopolysaccharide having no strong acid group. It comprises hexosamines such as N-acetyl-glucosamine, N-acetyl-galactosamine, etc., other sugar components such as galactose, fucose, etc. and proteinous matter such as peptide, etc.

In the sulfated neutral-mucopolysaccharide of this invention, the sulfate groups should be present at all the free amino groups of N-deacetylated hexosamines and at hydroxyl in the mucopolysaccharide. For example, sulfated mucopolysaccharide of hog gastric mucus shows strong absorptions in the infrared spectrum at wave lengths (cm.$^{-1}$) of 808, 1045, 1240, 1380, 1560, 1648, 2940 and 3460 and weak absorption at wave lengths (cm.$^{-1}$) of 680, 860, 925, 1010, 1120 and 1450. In those absorption bands, a strong absorption at 1240 cm.$^{-1}$ shows S=O stretching vibration of the sulfate groups, absorption at 808 cm.$^{-1}$ shows C—O—S vibration of the equatorial sulfate groups, and weak absorptions at 925 cm.$^{-1}$ and 860 cm.$^{-1}$ show C—O—S vibration of the axial sulfate groups, respectively.

The antilipemia activity of sulfated neutral-mucopolysaccharide of this invention is, for example, as shown in Table 1, in connection with sulfated neutral-mucopolysaccharide prepared from hog gastric mucus. SD rat is given alimentary lipemia by oral administration of cottonseed oil. Each value corresponds to that calculated by regarding normal rat's serum transparency as 0 and serum transparency of rats 2 hours after the administration of oil as 100. The lipemia clearing activity is a little weaker than that of heparin.

Table 1

Amount of administration of sulfated neutral-mucopolysaccharide (milligram/kilogram of rat's body weight):

| | |
|---|---|
| 0.5 | 0±30.5 |
| 2.0 | 0±35.2 |
| 5.0 | 56±14.3 |
| 20.0 | 100±5.8 |

No substantial ill effect is observed by the administration of the sulfated neutral-mucopolysaccharide of this invention. For example, the anticoagulant activity of sulfated neutral-mucopolysaccharide of hog gastric mucus is less than 6 U.S.P. units/milligram which is less than 5% that of heparin.

Sulfated neutral-mucopolysaccharide of this invention may be prepared, for example, by the following method. First N-deacetylated product of neutral-mucopolysaccharide is obtained from the starting material, neutral-mucopolysaccharide. For this purpose, it is most preferable that neutral-mucopolysaccharide is subjected to hydrazinolysis. Hydrazine acts on the neutral-mucopolysaccharide not only to obtain desired N-deacetylated hexosamines, but also to degenerate proteinous matter which is combined with the neutral-mucopolysaccharide. As the agent of hydrazinolysis, anhydrous hydrazine may preferably be employed. The hydrazinolysis may simply be carried out according to the general procedures. For example, it may be carried out in a sealed tube or under reflux. It is preferable to employ an excess amount of hydrazine in proportion to that of the starting material. Also, it may be preferable to repeat the hydrazinolysis. Degenerated proteinous matter is removable by known methods, for example, with ion exchange resin, etc. It is most preferable to obtain partially N-deacetylated product as precipitates by the addition of ethanol saturated with sodium chloride. Partially N-deacetylated product of the neutral-mucopolysaccharide thus obtained may be contaminated with inorganic ions, hydrazine, lower molecular weight substances, resulting from the hydrazinolysis, etc. It is preferable to remove these impurities by such methods as dissolving the product in distilled water and dialyzing the solution. Next, sulfate groups are introduced into the free amino groups of N-deacetylated hexosamines and into hydroxyl groups in the neutral-mucopolysaccharide. It is most preferable to carry out the N-sulfation under alkaline conditions and the O-sulfation under anhydrous conditions. By the sulfation, sulfate groups are introduced into all the free amino groups obtained with deacetylation of neutral-mucopolysaccharide, and into no less than one hydroxyl group per monosaccharide unit. Sulfation may preferably proceed in the presence of solvents such as pyridine, alcohols, acetone, chloroform, etc. The sulfating agent may, for example, be sulfur trioxide, fuming sulfuric acid, sulfuric acid or their mixture, or derivatives of sulfuric acid such as chlorosulfonic acid, etc. In the sulfation carried out under alkaline conditions, basic substances such as alkaline hydroxide, triethylamine and pyridine are employed. During the reaction the medium may be kept at about pH 9–10 by occasional addition of basic substances. N-sulfated neutral-mucopolysaccharide is preferably recovered as the precipitate by the addition of ethanol saturated with sodium chloride. If necessary, contaminations with, for example, inorganic ions, basic substances, lower molecular weight substances may be removed with ion exchange resin, dialysis, etc. Sulfation of hydroxyl groups may be carried out under anhydrous conditions according to the conventional method. If necessary, condensing agent such as phosphoric anhydride or aluminum chloride may be added. Generally, the sulfation proceeds most preferably with the employment of pyridine-sulfur trioxide under alkaline conditions and with the employment of liquid sulfur dioxide-sulfur trioxide.

Table 2 shows analytical data of one of the starting materials (a purified neutral-mucopolysaccharide obtained from hog gastric mucus), partially N-deacetylated product, N-sulfated product and N,O-sulfated product, respectively.

It shows that about 75% of N-acetyl groups are deacetylated, and that all of free amino groups are sulfated, and that the product contains approximately 1.29 sulfate groups per monosaccharide unit in the mucopolysaccharide.

Table 2

| Analysis | Starting material (percent) | Partially N-deacetylated mucopolysaccharide (percent) | N-sulfated product (percent) | N, O-sulfated product (percent) |
| --- | --- | --- | --- | --- |
| Nitrogen: | | | | |
| By Kjeldahl | 4.6 | 2.8 | 2.2 | 1.4 |
| By Van Slyke | 0 | 2.1 | [4] 0.2 | [4] 0.3 |
| | | [3] (75.0) | | |
| Hexosamine | [1] 35.9 | 34.0 | 26.8 | 17.5 |
| Galactose | 32.9 | 33.4 | 28.9 | 19.4 |
| L-Fucose | 13.8 | 13.4 | 10.4 | 4.6 |
| Sulfur | 0 | 0 | 3.8 | 9.7 |
| Ash | 3.1 | 2.5 | 13.5 | 31.2 |

[1] Glucosamine/Galactosamine, 2.0.
[2] Glucosamine/Galactosamine, 6.2.
[3] Percentage of free amino nitrogen in total nitrogen.
[4] A part of the N-sulfate is cleft under the Van Slyke assay condition.

Figure 2:
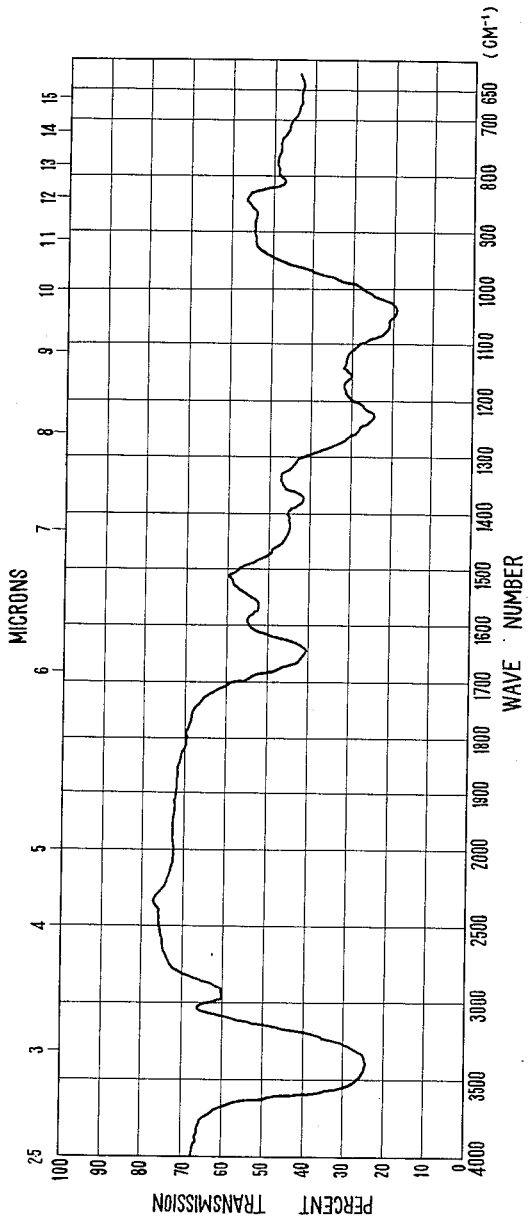

Also FIGS. 1, 2 and 3 of the accompanying sheets of drawing show respective infrared spectra of partially N-deacetylated product, N-sulfated product and N,O-sulfated product prepared from the neutral-mucopolysaccharide (blood group A mucopolysaccharide) of hog gastric mucus. As is seen in FIG. 1, partially N-deacetylated product shows strong absorption bands at 1070 (1010–1100) cm.$^{-1}$, 1230 (1200–1280) cm.$^{-1}$ 1380 cm.$^{-1}$, 1560 (1540–1575) cm.$^{-1}$, 1648 (1600–1685) cm.$^{-1}$, 2930 (2840–3000) cm.$^{-1}$ and 3400 (3200–3600) cm.$^{-1}$ and weak absorption bands at 815 cm.$^{-1}$, 880 (850–900) cm.$^{-1}$, 1030 cm.$^{-1}$, 1160 cm.$^{-1}$, 1310 (1295–1325) cm.$^{-1}$ and 1430 cm.$^{-1}$ in the infrared spectrum. Strong absorptions at 1648 cm.$^{-1}$ and 1560 cm.$^{-1}$ indicate N-acetyl groups. As is seen in FIG. 2, N-sulfated product shows strong absorption bands at 808 (800–825) cm.$^{-1}$, 1035 (1000–1095) cm.$^{-1}$, 1240 (1200–1260) cm.$^{-1}$, 1380 cm.$^{-1}$, 1560 (1540–1575) cm.$^{-1}$, 1648 (1600–1685) cm.$^{-1}$, 2920 (2880–2960) cm.$^{-1}$ and 3400 (3200–3600) cm.$^{-1}$, and weak absorption bands at 870 cm.$^{-1}$, 1075 cm.$^{-1}$, 1315 cm.$^{-1}$ and 1430 cm.$^{-1}$ in the infrared spectrum. A strong absorption at 1240 cm.$^{-1}$ is due to N-sulfate groups. As is seen in FIG. 3, N,O-sulfated product shows strong absorptions at 808 (785–835) cm.$^{-1}$, 1045 (1000–1080) cm.$^{-1}$, 1240 (1205–1290) cm.$^{-1}$, 1380 cm.$^{-1}$, 1560 (1540–1575) cm.$^{-1}$, 1648 (1600–1685) cm.$^{-1}$, 2940 (2880–2980) cm.$^{-1}$ and 3460 (3250–3620) cm.$^{-1}$ and weak absorptions at 680 (665–695) cm.$^{-1}$, 860 cm.$^{-1}$, 925 cm.$^{-1}$, 1010 cm.$^{-1}$, 1120 cm.$^{-1}$ and 1450 cm.$^{-1}$ in the infrared spectra. Strong absorption at 1240 cm.$^{-1}$ shows S=O stretching vibration of sulfate groups, absorption at 808 cm.$^{-1}$ indicates C—O—S vibration of equatorial sulfate groups, and weak absorptions at 925 cm.$^{-1}$ and 860 cm.$^{-1}$ both indicate C—O—S vibrations of the axial sulfate groups.

The analytical data and infrared spectrum show that sulfate groups are bound to all of the amino groups of the N-deacetylated hexosamines and to no less than one hydroxyl group in the monosaccharide unit of the mucopolysaccharide.

As the starting material of this invention, neutral-mucopolysaccharide is employed. Though there may be a small difference of the components of neutral-mucopolysaccharide depending on such conditions as the kind of mucopolysaccharide and the method for obtaining the neutral-mucopolysaccharide, etc., any one of the neutral-mucopolysaccharides may be employed as the starting material of this invention, so far as it contains N-acetyl-hexasamine in the mucopolysaccharide. For example, such neutral-mucopolysaccharide as chitin, mucopolysaccharide of hog gastric mucus, etc. may be employed as the starting material of this invention. Some of them may show blood group activity. Mucopolysaccharide of hog gastric mucus most preferably is employed in this invention. As the source of hog gastric mucopolysaccharide, mucus, mucus-mucin, commercial gastric mucin, etc. may be used as it is, if desired.

Mucopolysaccharide of hog gastric mucus is obtained by alkaline extraction of mucus, followed by further purification. For example, mucus may be extracted with 1 N sodium hydroxide at low temperature (0–3° C.). The extract is then acidified to about pH 4.5, and the resultant precipitate is removed. The water soluble product thus obtained is extracted with glacial acetic acid. After this treatment, a carbohydrate-containing material remains as a glacial acetic acid-insoluble residue. To remove some protein contaminants, the substance is precipitated with the reagent used in the biuret reaction (cupric sulfate and sodium hydroxide) at low temperature. The substance is then recovered from the precipitate with hydrochloric acid and ethanol. Alkaline extraction may be sufficient by only dissolving mucus or mucus-mucin in an aqueous solution of alkaline hydroxide, for example, in a solution of sodium hydroxide or potassium hydroxide. It may require about 12 hours to 2 days for mucus to be extracted completecely. Alkaline extraction may preferably proceed under shaking. Contents of each component of neutral-mucopolysaccharide of hog gastric mucus differ a little from each other depending on temperature at alkaline extraction. Generally it is most preferable to employ neutral-mucopolysaccharide obtained with alkaline extraction of hog gastric mucus at about 0–3° C.

Thus obtained mucopolysaccharide of hog gastric mucus shows a serological activity, and has specific agglutinogen similar to that of A or O erythrocyte.

In this specification percentages are all in weight percent.

EXAMPLE 1

100 grams of mucus are extracted with 200 milliliters of 1 normal NaOH by placing in a cold room (0–3° C.) for 2 days with occasional shaking to obtain a solution, which is acidified with glacial acetic acid to about pH 4.5. The supernatant is dialyzed, and the remaining precipitate is strained off. The filtrate thus obtained is concentrated in vacuo, followed by the addition of 15 times its volume of glacial acetic acid to obtain a voluminous precipitate. The mixture is shaken for 2 days, then centrifuged. The centrifugate is washed with 20 milliliters of glacial acetic acid twice and with 20 milliliters of alcohol three times, and is dried in vacuum desiccator over $H_2SO_4$ to obtain 0.9 gram of white powder. White powder thus obtained is dissolved in 90 milliliters of water, then 12 milliliters of 10% NaOH and 18 milliliters of 12.5% $CuSO_4$ are added in sequence under agitation at 0–3° C. The deposit is washed with 5 portions of 1% NaOH twice, and is dissolved in 10 milliliters of 10% HCl. To the solution 10 times its volume of alcohol is added to obtain precipitate. This $CuSO_4$-alkali process is repeated. The product is dissolved in 100 milliliters of water and is made free from copper completely by passing through a column of cation exchange resin. After the effluent is neutralized and condensed, alcohol is added to obtain precipitate, which is washed with alcohol and dried to obtain white powder of the starting material of this invention or blood group A mucopolysaccharide.

Ten grams of blood group A mucopolysaccharide, prepared by the above procedures, are hydrazinolyzed with 20 milliliters of anhydrous hydrazine in a sealed tube in boiling water for 10 hours. The hydrazinolyzate is poured into 400 milliliters of ethanol saturated with sodium chloride. The precipitates thus formed are collected by centrifugation and washed twice with 50 milliliters of ethanol and then dried over anhydrous calcium chloride and sulfuric acid in vacuo. This product is rehydrazinolyzed with 20 milliliters of anhydrous hydrazine, followed by the same treatments as above. Thus obtained product is dissolved in 300 milliliters of water and the solution is dialyzed against several changes of distilled water for 3 days. The non-dialyzable fraction is concentrated to about 30 milliliters under reduced pressure and the condensate is poured into 600 milliliters of ethanol saturated with sodium chloride, then the precipitates thus formed are treated in the same way as above.

To an aqueous solution of 2.8 grams of hydrazinolyzate in 80 milliliters of water is added pyridine-sulfur trioxide in small portions under continuous stirring at room temperature. During the course of the reaction, the pH of the reaction medium is maintained in the range 9–10 by the continuous gradual addition of a 30% sodium hydroxide solution. In this way 7 grams of pyridine-sulfur trioxide and 11.6 milliliters of 30% aqueous sodium hydroxide are added over a period of about 4 hours. The resultant reddish-brown solution is dialyzed in a cellophane bag against several changes of distilled water for 3 days to remove sodium sulfate, pyridine and other lower molecular weight materials and the condensate is adjusted to pH 9.5. Then sodium chloride is dissolved in the condensate, and the product is precipitated by the addition of 65 milliliters of ethanol. The mixture is kept standing in a refrigerator overnight. The supernatant of the mixture is removed by the decantation of the precipitates are washed three times with 50 milliliters of an ethanol-acetone (1:1) mixture and dried over phosphorus pentoxide in vacuo.

Three grams of the product are placed in a flask equipped with a stirrer, dropping funnel, and Dry Ice condenser and protected from moisture with a slow stream of dry nitrogen passing through sulfuric acid. The flask is cooled in an acetone-Dry Ice bath and dry sulfur dioxide is condensed into the flask to total volume of about 25 milliliters. Four grams of sulfan is introduced into a dropping funnel under anhydrous condition. The reaction vessel is well protected against humidity and the material in liquid sulfur dioxide is allowed to warm by subjecting to gentle reflux with continuous stirring. To the suspension is added the sulfan slowly over a period of 20 minutes, and the reaction is allowed to proceed under reflux with stirring for about 5 hours. Then to the reaction mixture is added anhydrous carbon tetrachloride and the sulfur dioxide is eliminated by the gentle evaporation from the reaction mixture. After sulfur dioxide is removed the supernatant of the mixture is decanted and the residue is washed several times with anhydrous carbon tetrachloride. The final residue is dissolved in 150 milliliters of ice-water containing 2.5 grams of sodium bicarbonate, and the resultant cold solution is adjusted to pH 9 with 20% aqueous sodium hydroxide. Inorganic sulfates are removed by dialysis in a cellophane bag until the solution outside of the bag gives a negative test for sulfate ion. The solution in the bag is then concentrated to 80 milliliters under reduced pressure. 0.9 gram of sodium chloride is dissolved in the condensate and the product is precipitated as a pasty solid by the addition of 200 milliliters of acetone. After the mixture is removed by decantation the paste is pulverized with ethanol and the powder is collected by centrifugation, followed by washing three times with acetone, then dried over phosphorus pentoxide in vacuo to obtain N,O-sulfated neutral-mucopolysaccharide.

EXAMPLE 2

To an aqueous solution of commercially available hog gastric mucin there are added sodium hydroxide and cupric sulfate to give precipitate. After washing with a mixture of ethanol and hydrochloric acid, the precipitate is dissolved in water and the solution is dialyzed for the removal of lower molecular weight substances followed by the addition of ethanol. The precipitate (1 gram) thus formed is employed as the starting material.

One part of the starting material is treated with two parts of anhydrous hydrazine in a sealed tube at 100° C. for 10 hours, followed by the addition of 20 parts of ethanol. The precipitate thus formed is rehydrazinolyzed by the same treatment as above and is dialyzed to obtain 0.4 gram of the hydrazinolyzate.

To an aqueous solution of the above product are added pyridine-sulfur trioxide and sodium hydroxide. During the course of the reaction, the reaction medium is maintained in the range of pH 9–10 by the continuous slow addition of sodium hydroxide solution. The resultant solution is dialyzed to remove lower molecular weight substances, and ethanol and acetone are added to obtain precipitate, which is suspended in liquid sulfur dioxide. Then, sulfur trioxide is introduced under cooling with a freezing agent. After sulfur di- and trioxide are eliminated by the addition of dried carbon tetrachloride, the residue is dissolved in an alkaline solution and the solution is dialyzed for the removal of sulfate and lower molecular weight substance. Then ethanol and acetone are added to obtain precipitate of N,O-sulfated neutral-mucopolysaccharide. Yield: 0.7 gram.

Having thus disclosed the invention, what is claimed is:

N,O-sulfated neutral-mucopolysaccharide of hog gastric mucus characterized by the following physicochemical properties:

(a) the N,O-sulfated neutral-mucopolysaccharide exhibits a characteristic absorption in the infrared region of the spectrum at the following frequencies, expressed in reciprocal centimeters: strong absorption bands at 808, 1045, 1240, 1380, 1560, 1648, 2940 and 3460, and weak absorption bands at 680, 860, 925, 1010, 1120 and 1450;

(b) the N,O-sulfated neutral-mucopolysaccharide contains about 25% of acetylated hexosamine and about 75% of free hexosamine;

(c) each amino moiety of free hexosamine of the N,O-sulfated neutral-mucopolysaccharide has sulfate bound to the amino nitrogen thereof in the form of N-sulfate;

(d) each saccharide moiety of the N,O-sulfated neutral-mucopolysaccharide contains at least one O-sulfate;

(e) the N,O-sulfated neutral-mucopolysaccharide, on analysis, shows a content of about 20% by weight of hexosamine, about 20% by weight of galactose, about 5% by weight of fucose, about 10% by weight of sulfur and about 30% by weight of ash; and (f) the N,O-sulfated neutral-mucopolysaccharide contains approximately 1.29 sulfate groups per monosaccharide unit in said mucopolysaccharide.

References Cited by the Examiner

UNITED STATES PATENTS

| | | | |
|---|---|---|---|
| 2,755,275 | 7/56 | Cushing | 260—211 |
| 2,959,583 | 11/60 | Doezi | 260—234 |
| 3,027,363 | 3/62 | Warner | 260—211 |

(Other references on following page)

OTHER REFERENCES

Besterman: J. Parm. and Pharmacol., vol. 9, No. 6, p. 421, 1957.

Constantinides: Arch. Int. Pharmacodyn., vol. XCIX, Nos. 3-4, 1954, pp. 334-345.

Doczi: J. Am. Chem. Soc., vol. 75, 1953, pp. 1512-1513.

Warner et al.: J. Org. Chem., vol. 23, 1958, pp. 113-1135.

Wolfrom: J. Am. Chem. Soc., vol. 75, 1953, p. 1519.

Yosizawa et al.: J. Biochem., vol. 51, 1962, pp. 1-11, 145-154, 155-161, 162-165, 233-241.

Yosizawa et al.: Biochem. et Biophys. Acta, vol. 52, 1961, pp. 588-591 and 591-593.

JULIAN S. LEVITT, *Primary Examiner.*

FRANK CACCIAPAGLIA, Jr., *Examiner.*